United States Patent [19]

Anderson

[11] 4,427,357
[45] Jan. 24, 1984

[54] DOUGH BALL ROLLING APPARATUS

[75] Inventor: Joseph R. Anderson, Ada, Mich.

[73] Assignee: Werner Lehara, Inc., Grand Rapids, Mich.

[21] Appl. No.: 375,736

[22] Filed: May 7, 1982

[51] Int. Cl.³ .................... A21B 7/01; A21C 11/00; B29C 15/00
[52] U.S. Cl. .................... 425/333; 425/372
[58] Field of Search ............... 425/332, 333, 363, 364, 425/329, 372, 373; 65/143

[56] References Cited

U.S. PATENT DOCUMENTS

| | | | |
|---|---|---|---|
| 793,155 | 6/1905 | Piper | 425/332 |
| 901,577 | 10/1908 | Williams | 425/333 |
| 2,790,397 | 4/1957 | Winkler | 425/333 |
| 3,274,959 | 9/1966 | Jimenez et al. | 425/332 |
| 3,521,578 | 7/1970 | Fraioli | 425/332 |
| 4,008,025 | 2/1977 | Campbell | 425/332 |
| 4,025,273 | 5/1977 | Mauer et al. | 425/332 |

FOREIGN PATENT DOCUMENTS 230820 5/1963 Austria .................. 425/332

*Primary Examiner*—Willard E. Hoag
*Attorney, Agent, or Firm*—Price, Heneveld, Huizenga & Cooper

[57] ABSTRACT

A device for shaping pieces of dough-like material into a generally spherical shape includes a fixed support defining a wall and a support base and a rotatable disc having an inner peripheral surface facing said support wall. The fixed support and rotatable member define a truncated, V-shaped groove in transverse cross section. A lower conveyor includes a run extending over the base and through the groove. An upper conveyor includes a run which extends over the top of the groove. The rotatable disc and conveyor are driven at different relative speeds so that a piece of material conveyed through the groove by the lower conveyor belt is formed into a generally spherical shape. A plurality of such devices are supported on a common frame which may be positioned in line to receive a plurality of pieces of dough which are arranged in spaced, parallel rows.

34 Claims, 4 Drawing Figures

DOUGH BALL ROLLING APPARATUS

BACKGROUND OF THE INVENTION

The present invention relates to an apparatus for shaping a plastic, deformable or dough-like material into a generally spherical or ball-like shape.

In a wide variety of processes, it is desirable for a deformable, plastic or dough-like piece of material to be worked or rolled into a ball shape. For example, in the food industry, rolling of a dough into a ball may be desirable to obtain a particular color, shape and/or texture of the ultimate food product. To form a bread with a crust, it is necessary to work the bread dough and roll it into a ball prior to baking. Rolling the dough into a ball shape prior to baking will also create a desirable internal structure. Rolling of the dough-like material into a ball may also be necessary or desirable to produce various candy products, cookie products and the like.

Heretofore, various proposals have been made for forming dough into a ball shape. Such proposals include devices known as belt rounders, cup rounders, plate rounders, Duchess dividers and cone rounders.

A belt rounder includes an elongated, endless conveyor belt and a shaped shoe which extends at an angle transversely of the belt. A piece of dough will be forced to roll upon itself as the belt moves it into contact with the shaped shoe. The dough will move transversely of the belt during the forming process. The production capacity or speed of a belt rounder is limited. Also, it is operable on only a limited range of dough materials.

A cup rounder is typically used in working dough to produce hamburger or hot dog buns. Such a rounder is a generally cone-shaped device which is placed over a piece of dough on a conveyor. The cup is then moved in an orbital fashion to work the dough. A cup rounder does not provide a true spherical shape. The finally shaped product is generally oblong in configuration and is worked around a horizontal plane. This results in a softer top and bottom and the peripheral crust area.

A plate rounder has been used generally in the candy industry. With this approach, a plurality of pieces of the candy dough material are placed on a stationary lower plate. An upper plate is moved in contact with the pieces. The upper plate is then moved in an orbital fashion. Such a plate device has low production capacity.

Duchess dividers are similar to the plate roller. The divider has an upper plate supporting a plurality of knife-like members which extend radially outward from a central point. The upper plate when moved into contact with the dough cuts the dough into a plurality of pie sections. The upper plate is moved in an orbital or rolling fashion to roll the material into the desired shape.

A cone rounder includes a cone-shaped member which is rotated about its central axis. In one form, a shoe extends in a generally spiral fashion down the outside surface of the cone. The shoe is configured so that a piece of material which is dropped into the shoe at the top adjacent the apex of the cone will move downwardly due to gravity and the rotation of the cone. The dough is subjected to variable velocities which causes it to roll into a generally ball shape. Cone rounders which use the outside surface of the cone are generally prevalent in the United States. In Europe, cone rounders typically have the shoe mounted on the inside surface of the cone. The dough is placed into the cone at the bottom and is moved upwardly towards the base of the cone from the apex. Cone rounders subject the dough material to forces from several different directions at the same time.

The prior devices which have been proposed for shaping plastic, deformable or dough-like materials into ball or spherical-shaped objects suffer from relatively slow production speeds and limitations imposed by the nature of the material being rounded, being effective only with certain types of dough materials. Also, they are generally not effective when the pieces of dough to be rounded are of relatively small size. Dough used to form bread products, cookies, candy and other objects will vary in consistency, oiliness and the like. The prior approaches are not readily adaptable to varying material conditions or characteristics. The prior approaches if not operated properly can tear the material. This results in improper working of the dough and an undesirable internal structure. Further, most prior rounders (other than belt rounders) are not insertable into the high-production multi-lane or row production lines found in the bread industry, candy industry and cookie industry. These limitations seriously restrict production capacity.

SUMMARY OF THE INVENTION

In accordance with the present invention, a unique device is provided for rolling a piece of plastic, deformable or dough-like material into a generally spherical shape. Essentially, the device includes an elongated base and a pair of walls or surfaces which extend along the lateral edges of the base. One of the walls is removable with respect to the base. The base and the walls define an elongated groove through which a conveyor means extends. Relative motion between the walls and the conveyor subjects a piece of material to multiple velocities and forces, causing it to roll into a ball-like shape.

In narrower aspects of the invention, the groove has a generally truncated, V shape in transverse cross section and a top or upper conveyor belt structure closes off the top of the groove. Frictional forces generated as the piece of material contacts the multiple surfaces which move at relatively different speeds works the material without tearing. The resulting product may have a worked outer surface and a concentric multi-core inner structure. The structure is not as dependent on the characteristics of the dough as prior devices for achieving the desired results.

A plurality of the devices may be mounted on a common frame in a transversely spaced relationship and positioned in line in a production line. Each will then operate on tandemly spaced pieces of material which approach the device in a row. Relatively high production capacities are achievable and the desired color, shape and texture of the resulting product is achieved.

DETAILED DESCRIPTION OF THE PREFERRED EMBODIMENT

Figure 1:
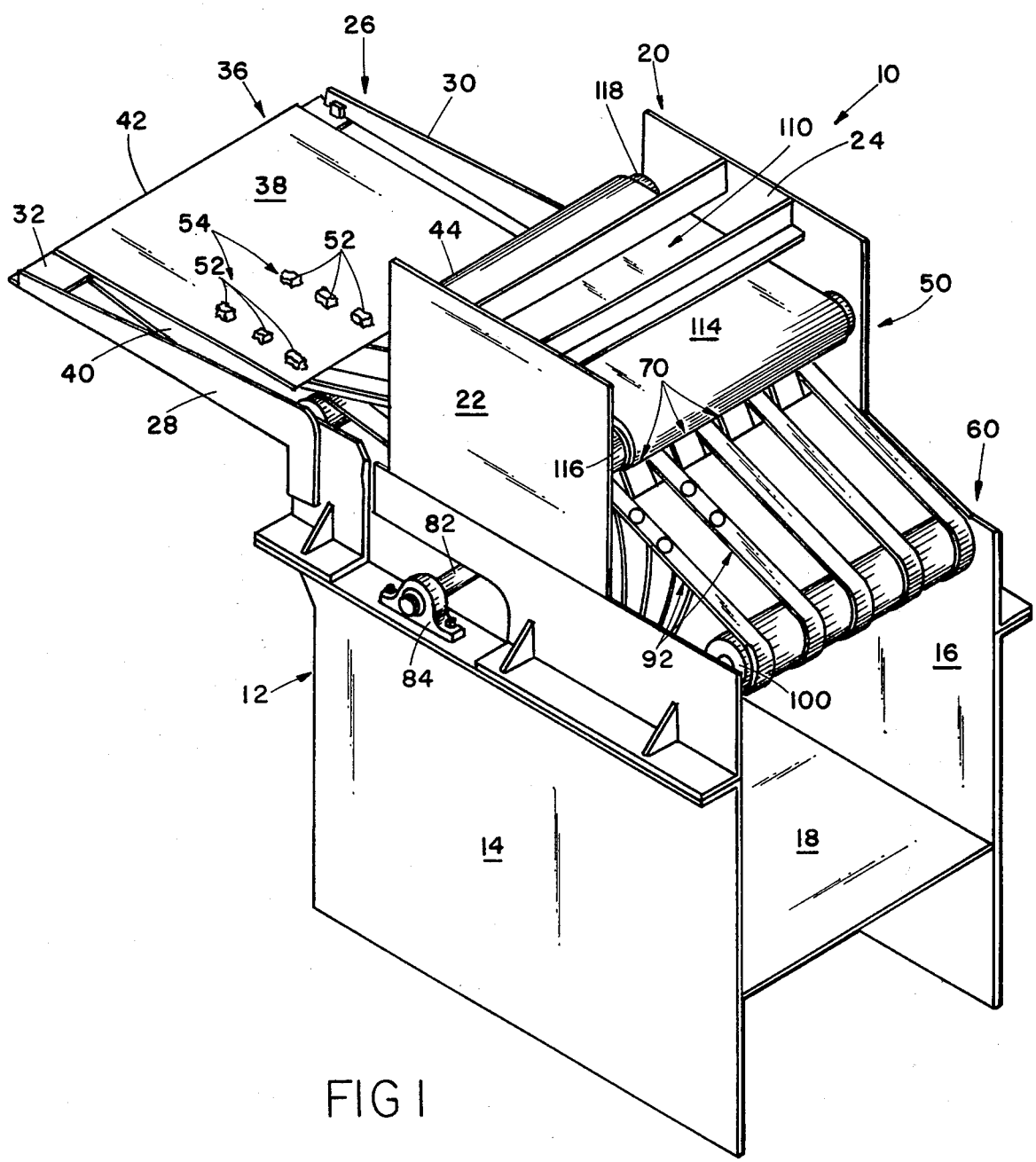
FIG. 1 is a perspective view of an apparatus in accordance with the present invention.

A preferred embodiment of a dough ball roller in accordance with the present invention is illustrated in FIG. 1 and generally designated 10. Apparatus 10 includes a main frame 12 having sides 14, 16 and a base 18. Mounted on the main frame 12 is a subframe structure 20 including side plates 22 and 24. An extension 26 projects outwardly from an end of the frame 12. Extension 26 includes arms 28, 30 and a nose piece 32. Supported on structure 26 is an infeed conveyor 36. Infeed conveyor 36 is an endless belt conveyor having an upper run 38 and a lower run 40. Conveyor 36 defines an inlet or infeed end 42 and a discharge end 44.

Supported on subframe 20 and main frame 12 at the discharge end 44 of conveyor 36 is a dough ball rolling means generally designated 50. Rolling means 50 receives a plurality of generally oblong or unshaped dough-like, plastic or deformable pieces of material 52 and forms them into generally spherical-shaped objects. As seen in FIG. 1, the pieces approach the rolling means in a plurality of transversely spaced rows 54. Pieces 52 within each row are in an aligned, spaced, tandem relationship. Apparatus 10 is positionable in a production line to receive spaced rows of product and discharge them at an end 60 of apparatus 10.

Figure 3:
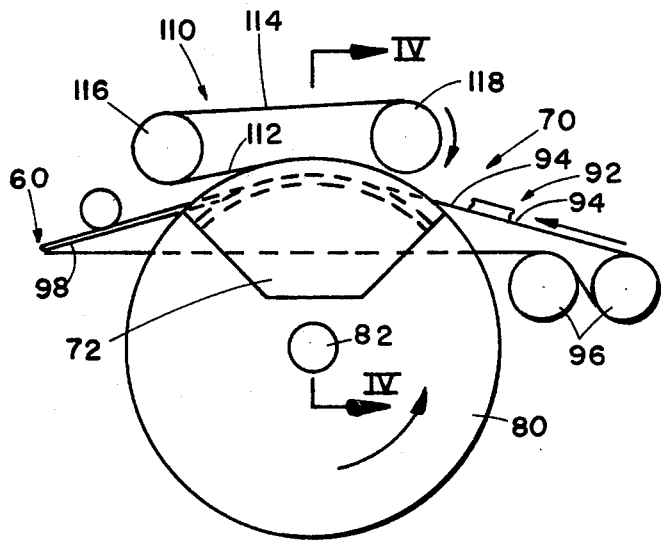
FIG. 3 is an enlarged, schematic view of a rolling means in accordance with the invention and included in the apparatus of FIGS. 1 and 2.
Figure 4:
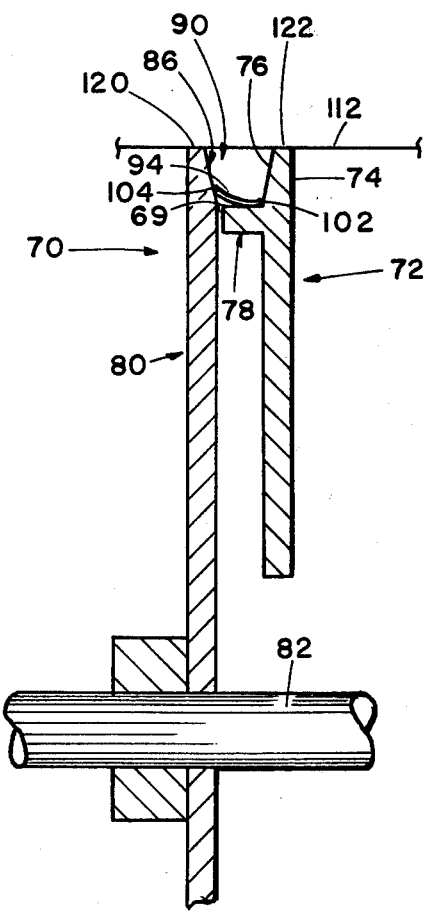
FIG. 4 is an enlarged, cross-sectional view taken generally along line IV—IV of FIG. 3.

As best seen in FIGS. 3 and 4, the rolling means 50 is made up of a plurality of coaxially positioned, transversely spaced individual rolling devices generally designated 70. Each device 70 includes a support structure or support member 72. In the preferred embodiment, member 72 includes a vertical wall 74 having an upper, inner peripheral surface 76 (FIG. 4) and a flange or base 78. As illustrated, flange 78 is formed integral with wall 74. Supported in opposed, facing relationship to wall 74 is a moving wall, rounding member or rounding disc 80. Disc 80 is nonrotatably secured to a shaft 82 at its central axis. As seen in FIG. 1, shaft 82 is supported on frame 12 by pillow block bearings 84. Shaft 82 extends transversely of the frame 12 and the subframe 20. Each of the discs 80 of the rolling means or apparatus 70 are nonrotatably supported on the common shaft 82.

Figure 2:
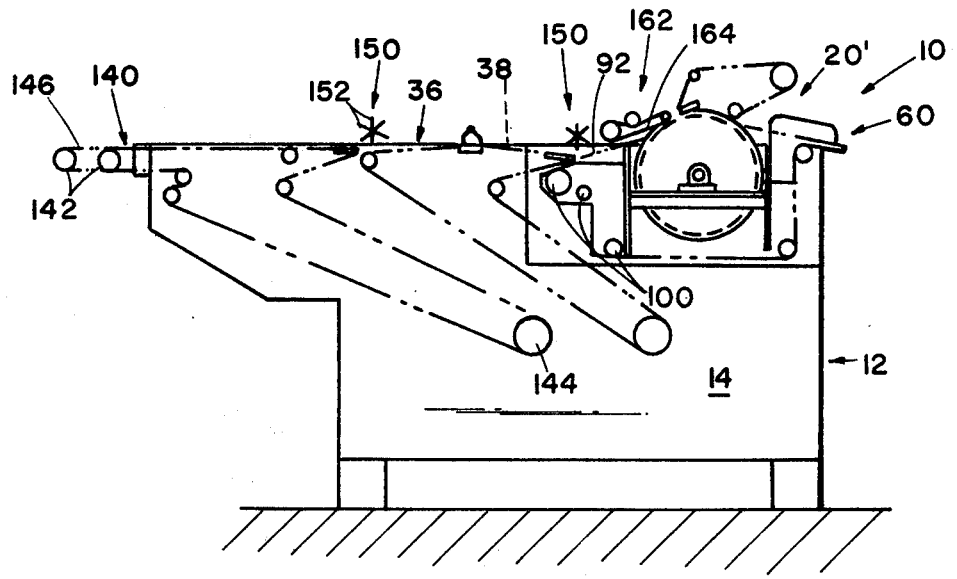
FIG. 2 is a side, elevational view of an apparatus in accordance with the present invention.

As best seen in FIG. 4, an inner peripheral surface 86 which extends around the circumference of the disc is beveled or angled from vertical. The opposed facing surface 76 of member 72 is similarly angled or beveled. As a result, member 72 and disc 80 define a truncated V-shaped groove 90 in transverse cross section. Extending through groove 90 is an elongated lower conveyor means or belt structure 92. Belt 92 includes an upper run 94 which rides on an upper surface 96 of base 78. Belt 92 is an endless conveyor belt which extends around suitable rollers 96. As illustrated in FIG. 3, belt 92 may extend around a pair of rollers at an inlet end and around a nose bar-like structure 98 at the discharge end. In the alternative, as illustrated in FIGS. 1 and 2, belt 92 may extend around a plurality of rollers 100 which are supported on a subframe structure 20' (FIG. 2) or upon subframe 20, as illustrated in FIG. 1.

In the preferred form, belt 92 has a transverse or width dimension which is greater than the width dimension of groove 90 at base 78. As run 94 traverses base 78, it will assume a generally curved or cup shape, as shown in FIG. 4. A lateral edge 102 slides against surface 96 at its juncture with base 78. Another lateral edge 104 moves along the moving inner peripheral surface 86 of rotating disc 80. Dimensioning the belt 92 in this fashion seals or closes off the space or crack between disc 80 and base 78. Also, the belt cupping assists in the rolling action.

As seen in FIG. 3, support member 72 has the shape of a sector of a circle which has a common axis with disc 80. Base 78 extends along an arc also having a radius extending from the center of shaft 82 or disc 80.

Positioned above groove 90 is an upper conveyor means or endless belt 110. Upper belt 110 includes a lower run 112 and an upper run 114 (FIG. 3). The endless belt 110 extends around rollers 116, 118. Run 112 defines a top for the groove 90 and, as seen in FIGS. 3 and 4, comes into contact with an edge 120 of disc 80 and an edge 122 of support member 72. As seen in FIG. 1, it is preferred that belt 110 have a transverse or width dimension so that it extends across each of rolling devices 70.

Belts 110 and 92 are fabricated from materials which match the dough characteristics. The belts have frictional and release characteristics which produce optimum rolling action for the particular dough material. Different belts will work with a wide variety of doughs, but it has been determined that certain belt materials will work better than others with specific types of doughs. With what is referred to in the food industry as an oily dough, it is presently preferred that the belts are formed from polyurethane and polyester. The polyurethane surface contacts the dough pieces. Such a belt has desired release characteristics, yet proper frictional characteristics to impart the desired forces on the dough piece. One such belt is that sold under the trademark HABASIT and designated FNB-2E. Such a belt is resistant to abrasion, has good release properties, sufficient tensile strength, is easy to clean and has good straight tracking action.

As explained in further detail below, a piece of dough material 52 entering groove 90 on belt 92 is exposed to four surface speeds simultaneously. The dough piece will be in contact with the angled surface 76, the moving, angled surface 86 of disc 80, run 94 and run 112. By selecting the relative speeds of run 112, disc 80 and belt surface 94, a dough piece is caused to roll. Proper selection of the relative speeds prevents tearing or ripping of the dough piece, and the piece will be moved about a center of rotation. The resulting piece will have a worked outer surface and concentric inner layers or cores. The angled surfaces 86, 76 subject the piece to speed variations since the surface speed, for example, of surface 86 varies along its radius line out to edge 120. This improves the rolling action imparted onto the piece of material.

In the apparatus of FIG. 2, additional belt structures are schematically illustrated. In a production model of device 10, it is believed that it would be advantageous to include an induction belt 140. Induction belt 140 extends around rollers 142 and a drive roller 144. Belt 140 includes an upper run 146 which moves at a speed less than the surface speed of upper run 38 of belt 36. Belt 36 would, in effect, be an acceleration belt to insure adequate spacing between pieces 52 in each row. Further, with certain types of products, it may be necessary to include paddle wheel structures 150 at the inlet and discharge ends of belt 36. Paddle wheel structures 150 include a plurality of radiating paddle members 152 which extend the full transverse or width dimension of belt 36. Pieces leaving belt 140 would come into contact with the paddle 152 which would partially restrain movement of the piece on belt 36. This further insure proper spacing of the product.

An upper infeed belt structure 162 may also be included. Structure 162 would include an endless belt having a run 164 in opposed, vertically spaced relationship to belts 92. Pieces 52 would be contacted by surface 164 and surface 94 and fed into the groove 90 defined by disc 80 and support 72. Further, it may be desirable to include vertically oriented, transversely spaced guides which would extend along the lateral edges of run 94 at the infeed end to apparatus 50. Such would retain the pieces on the belt.

OPERATION

Device 10 is positionable in a production line. Conveyor 36 receives a plurality of transversely spaced rows of tandemly oriented dough-like pieces 52. Pieces 52 are deposited onto upper runs 94 of the individual lower belts 92. The pieces 52 are moved into grooves 90 where they are subjected to multiple forces and varying velocities. The forces exerted on to the piece cause it to roll upon itself into the desired spherical or ball shape. The pieces are discharged from the groove 90 on belts 92 in the desired shape, as illustrated in FIG. 1. Device 10 would deposit these pieces onto another conveyor belt structure which could lead to a baking oven, for example.

Structure 10 is capable of relatively high speed operation and greatly increased production capacity when compared to the prior rolling devices. Further, structure 10 will properly shape relatively smaller pieces of material than has heretofore been possible. Device 10 can operate on a continuous, nonbatch basis.

The resulting shaped product will have desirable internal structure, shape and texture. The device will properly operate on a wider variety of materials than prior known devices. Device 10 is not as dependent on the material characteristics as prior devices. As material characteristics change, the speed ratios of the surfaces 76, 86, 122 and 94 may be varied to achieve the desired shaping. Variation of these speed ratios is essentially an empirical process. Proper shaping has been achieved with an oily dough material with the disc surface 86 driven at speed approximately twice the speed of belt 92 and with run 112 of upper belt structure 110 driven at a speed approximately half the speed of belt 92. The drive rollers for the various belts and the drive for shaft 82 preferably include variable speed controls to adjust the relative velocities during initial set-up for a particular material mix. Such speed controls are, of course, well known in the art.

Confining the product within the configured groove 90 and exposing the product outer surfaces to the varying velocities prevents tearing or destruction of the product surface. An axis of rotation of the product piece is also achieved.

While primarily adapted for the food product industry and usable to shape cookie dough, bread dough and the like, the rolling apparatus could be used to shape any generally deformable, plastic or dough-like material. The device could, therefore, have applicability in a wide variety of manufacturing fields other than the food industry.

In view of the foregoing description, those of ordinary skill in the art will undoubtedly envision various modifications to the device which would not depart from the inventive concepts disclosed herein. For example, structure other than disc 80 could be employed to create a moving peripheral surface which would expose the dough to a varying velocity. It is therefore expressly intended that the above description should be considered as only that of the preferred embodiments. The true spirit and scope of the present invention may be determined by reference to the appended claims.

The embodiments of the invention in which an exclusive property or privilege is claimed are defined as follows:

1. A device for shaping a piece of plastic or deformable material into a generally rounded form, said device comprising:
   an elongated base having a pair of lateral edges;
   an elongated support surface extending along one of said lateral edges of said base;
   a movable rounding member defining an inner surface facing said elongated support surface, said rounding member, said base and said support surface defining a generally truncated V-shaped groove;
   a lower conveyor belt having a run extending along said base within said groove;
   an upper conveyor belt having a run extending in generally spaced, parallel relationship to said run of said lower conveyor belt; and
   drive means operably connected to said rounding member, said lower belt and said upper belt for driving said member and said belts at different relative speeds to cause a piece of material transported into said groove by said lower belt to be shaped into a generally rounded form.

2. A device as defined by claim 1 wherein said rounding member is a disc.

3. A device as defined by claim 2 wherein said base is curved along an upper surface upon which said lower belt rides.

4. A device as defined by claim 3 wherein said support surface is joined to said lateral edge so that said groove in side elevation defines an arc of a circle.

5. A device as defined by claim 3 wherein said lower belt has a transverse dimension greater than the transverse dimension of said groove at said base.

6. A device as defined by claim 4 wherein said lower belt has a transverse dimension greater than the transverse dimension of said groove at said base.

7. Apparatus for rolling a piece of dough-like material into a generally ball-like shape, said apparatus comprises:
   a fixed support defining a wall having an inner peripheral surface and a support base extending outwardly from said wall;
   a rotatable member having an inner peripheral surface closely adjacent to and facing said support so that said support and said member define a longitudinally extending groove having a moving sidewall, a fixed base and a fixed sidewall;
   conveyor means extending over said support base between said moving sidewall and said fixed sidewall for conveying a piece of said dough-like material along said groove; and
   power means engaging said rotatable member for rotating said member in the same direction as said dough-like material is conveyed.

8. Apparatus as defined by claim 7 wherein said support base is generally curvilinear in side elevation.

9. Apparatus as defined by claim 8 wherein said inner peripheral surface of said support wall is angled with respect to said support base.

10. Apparatus as defined by claim 9 wherein said rotatable member is a disc having a beveled inner peripheral surface defining said moving sidewall so that said groove has a truncated V shape in transverse cross section.

11. Apparatus as defined by claim 10 wherein said conveyor means comprises a lower endless belt conveyor having an upper run which rides on said support base.

12. Apparatus as defined by claim 7 wherein said groove has a truncated V shape in transverse cross section.

13. Apparatus as defined by claim 7 further including:
an elongated top extending over said support base in close proximity to said support wall and said rotatable member to define a top for said groove along at least a portion of the length thereof.

14. Apparatus as defined by claim 13 wherein said elongated top comprises:
an upper belt conveyor having a lower run which defines said top for said groove.

15. Apparatus as defined by claim 14 wherein said conveyor means comprises a lower endless belt conveyor having an upper run which rides on said support base.

16. Apparatus as defined by claim 15 wherein said lower endless belt conveyor upper run has a transverse dimension greater than the spacing between said walls of said groove.

17. Apparatus as defined by claim 16 wherein said support base is generally curvilinear in side elevation.

18. Apparatus as defined by claim 17 wherein said inner peripheral surface of said support wall is angled with respect to said support base.

19. Apparatus as defined by claim 18 wherein said rotatable member is a disc having a beveled inner peripheral surface defining said moving sidewall.

20. Apparatus as defined by claim 19 wherein the radius of curvature of said support base and the radius of curvature of said disc have a common center.

21. Apparatus as defined by claim 20 wherein said disc rotates at a speed such that the inner peripheral surface thereof moves longitudinally at a speed approximately twice the longitudinal speed of said lower belt conveyor.

22. Apparatus as defined by claim 21 wherein said lower run of said upper endless belt is stationary.

23. Apparatus as defined by claim 21 wherein said lower run of said upper endless belt moves longitudinally relative to said fixed support.

24. Apparatus as defined by claim 23 wherein said upper endless belt moves at a speed approximately one-half the speed of said lower belt.

25. An apparatus insertable into a conveyor line upon which are positioned a plurality of transversely spaced, generally parallel rows of tandemly arranged pieces of dough-like material for shaping each of said pieces into a generally ball-like shape and discharging such shaped pieces onto a discharge conveyor, said apparatus comprising:
a frame;
an infeed conveyor supported on said frame, said conveyor having an inlet end and discharge end; and
a plurality of shaping means supported on said frame at the discharge end of said infeed conveyor, each of said shaping means for receiving one of a plurality of rows of dough-like pieces, shaping each of said pieces into a generally ball-like shape and discharging said shaped pieces in tandemly-arranged sequence and in a plurality of transversely spaced, generally parallel rows generally aligned with said rows of pieces on said infeed conveyor;
each of said shaping means comprising a support defining a wall having an inner peripheral surface and a support base extending outwardly from said wall, a movable member having an inner peripheral surface closely adjacent to and facing said support so that said support and said member define a longitudinally extending groove having at least one moving sidewall, a base, and a second sidewall opposed to the first sidewall;
conveyor means extending over said support base between said sidewalls for conveying a piece of said dough-like material along said groove; and
power means engaging said movable member for moving said member.

26. An apparatus as defined by claim 25 further including:
induction conveyor means on said frame for depositing said pieces onto said infeed conveyor in spaced, tandem relationship.

27. An apparatus as defined by claim 25 further including:
an endless upper conveyor belt supported on said frame and having a lower run which extends over each of said rolling means.

28. Apparatus as defined by claim 27 further including a plurality of upper infeed conveyors supported on said frame and each having a lower run spaced above said conveyor means of said rolling means to help feed said pieces into said grooves.

29. An apparatus as defined by claim 27 wherein said movable member of each of said rolling means is a rotatable disc having a beveled inner peripheral surface and said inner peripheral surface of said wall is angled with respect to said base so that said groove has a generally truncated V shape in transverse cross section.

30. An apparatus as defined by claim 29 wherein each of said grooves defines an arc of a circle in side elevation.

31. An apparatus as defined by claim 30 wherein said conveyor means of each of said rolling means comprises an elongated, endless conveyor belt having a width dimension greater than the width dimension of said truncated groove at said base.

32. An apparatus as defined by claim 31 wherein each of said grooves defines an arc of a circle in side elevation.

33. An apparatus as defined by claim 32 further including a plurality of upper infeed conveyors supported on said frame and each having a lower run spaced above said conveyor means of said rolling means to help feed said pieces into said grooves.

34. An apparatus as defined by claim 33 further including:
induction conveyor means on said frame for depositing said pieces onto said infeed conveyor in spaced, tandem relationship.

* * * * *